T. C. MOORSHEAD.
METHOD OF MAKING GLASSWARE.
APPLICATION FILED FEB. 5, 1917.
1,274,577.
Patented Aug. 6, 1918.
2 SHEETS—SHEET 1.
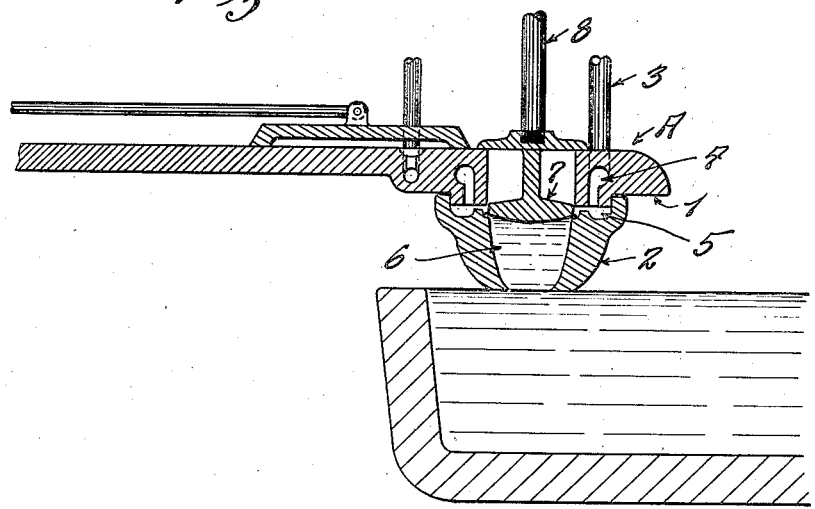
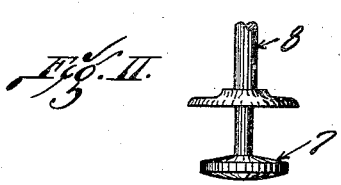
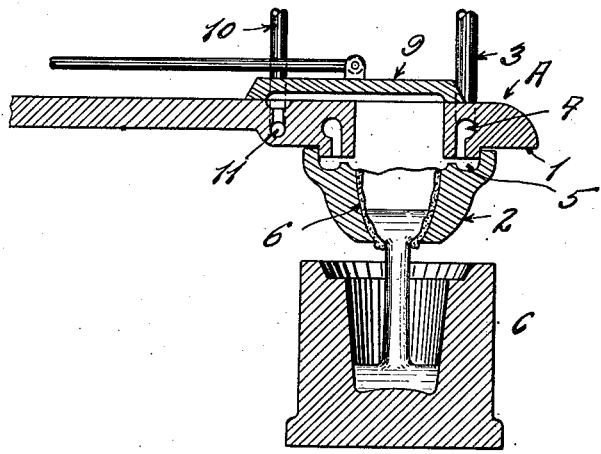

T. C. MOORSHEAD.
METHOD OF MAKING GLASSWARE.
APPLICATION FILED FEB. 5, 1917.
1,274,577.
Patented Aug. 6, 1918.
2 SHEETS—SHEET 2.
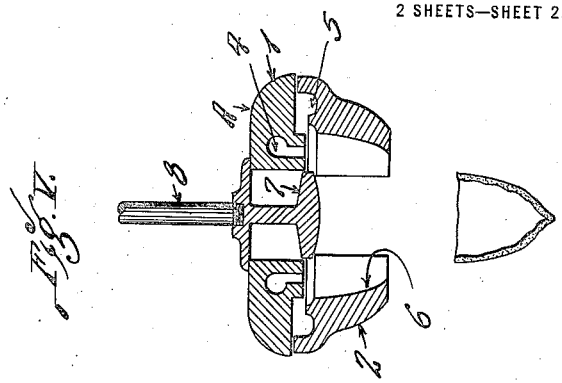
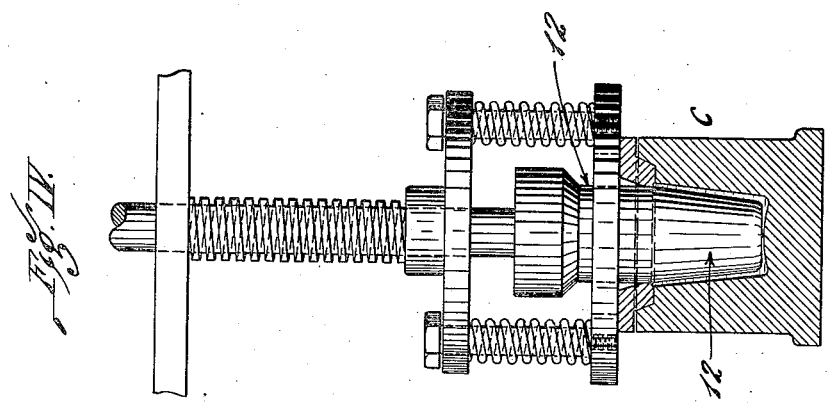
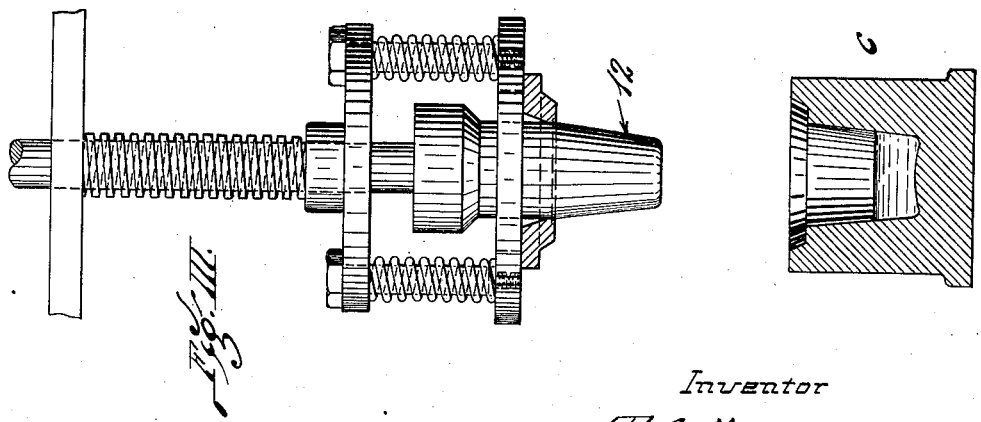
Inventor
T. C. Moorshead,
by Knight + Cook
Attorneys

UNITED STATES PATENT OFFICE.

THOMAS C. MOORSHEAD, OF ALTON, ILLINOIS.

METHOD OF MAKING GLASSWARE.

1,274,577.

Specification of Letters Patent.

Patented Aug. 6, 1918.

Application filed February 5, 1917. Serial No. 146,660.

*To all whom it may concern:*

Be it known that I, THOMAS C. MOORS-HEAD, a citizen of the United States of America, a resident of Alton, in the county of Madison, State of Illinois, have invented certain new and useful Improvements in Methods of Making Glassware, of which the following is a full, clear, and exact description, reference being had to the accompanying drawings, forming a part of this specification.

My invention relates to a method of molding glass articles, such as tumblers and other pressed glassware, the invention having for its object to provide a method that eliminates the delivery of congealed, or partially congealed, molten glass from a pouring vessel to a forming mold, providing on the contrary for the delivery to such mold of only absolutely molten glass. The essential aim of such method is to avoid the production of imperfect glassware, which results from the delivery of a mixture of absolutely molten and partly chilled or congealed glass into a forming mold. When a mass in this un-uniform condition is delivered into a forming mold and pressed the article produced is wavy or rough and imperfect, whereas by delivering only absolutely molten glass to the forming mold, as provided for by my method, the glassware produced is smooth and perfect.

In carrying out my method I preferably use the portions of apparatus shown in the accompanying drawings, in which—

Figure I is a vertical section of a pouring cup, said cup being illustrated in position to receive a charge of molten glass.

Fig. II is a view of the pouring cup shown in Fig. I in discharging position over a forming mold.

Fig. III is a view partly in elevation and partly in section of the forming mold and the plunger movable thereto, the plunger being shown in elevated position.

Fig. IV is a view similar to Fig. III, with the plunger in the forming mold.

Fig. V is a vertical section of the pouring cup as it appears when opened to release the shell of congealed glass which is left in the cup after the glass utilized has been discharged therefrom.

In carrying out my method, by the use of the apparatus shown, the pouring cup A is first brought into position over a basin B containing molten glass. Said pouring cup includes an upper body member 1 and a lower intake member 2, the latter being open at its lower end to permit molten glass from the basin B to be drawn thereinto while the intake member 2 is in contact with the surface of the molten glass. A suction pipe 3 is in communication with a duct 4 in the body member 1 of the pouring cup A, and said duct 4 is in turn in communication with a duct 5 in the intake member 2, which leads to the well 6 that receives the molten glass. A gate 7 carried by an operating rod 8 is movable through a vertical aperture in the body member 1 of the pouring cup A to the upper end of the well 6 adjacent to the duct 5, said gate being adjustable into such proximity with the upper end of said well as to leave only a narrow space between the wall of the well and the gate, hence when suction is created in the ducts 4 and 5 there is sufficient suctional action in the well 6 to draw molten glass thereinto from the basin B. Immediately after the well of the pouring cup A has been filled with molten glass, the gate 7 is withdrawn into the position seen in Fig. II and a cover 9 is moved into position over the aperture through which the gate 7 is moved and closes the upper end of said aperture.

The pouring cup A having been moved from the basin B to a position over a forming mold C, (see Fig. II) a blast of air is delivered through a blow pipe 10 into a duct 11 in the upper member of the pouring cup A, and passes from the duct 11 to and beneath the cover 9 to the aperture from which the gate 7 has been withdrawn and to the well 6 containing the molten glass.

The air under pressure delivered to the well of the pouring cup as described acts on the glass therein with sufficient force to break the skin of congealed glass which formed at the bottom of the well 6, by coagulation, as an immediate result of the separation of the glass in the well of the pouring cup from the glass in the basin B. As a consequence the hot fluid glass within and at the center of the well 6 of the pouring cup is quickly expelled, but the portion of the glass which has become chilled and congealed, by contact with the wall of the well 6, remains in the well 6. It will therefore be seen that the molten glass which is introduced into the forming mold is absolutely fluid and free of coagulation, and will spread evenly in the forming mold, and that an article of glassware produced therefrom will be of the same texture and density at all points, and free of the imperfections which would exist if the chilled shell left in the pouring cup were discharged into the forming mold.

Following the introduction of the molten glass into the forming mold, the plunger 12 is lowered into the mold from the position seen in Fig. III to the position seen in Fig. IV according to common practice and the tumbler or other article of glassware is produced.

The intake member of the pouring cup A is expansible and contractible, and when the molten glass has been discharged from the well of said cup the intake member is opened as seen in Fig. V, thereby discharging the shell of congealed glass, which may be returned to the glass furnace to be remelted and reused.

While I have described the use of air pressure to expel glass from a pouring cup in carrying out my method, I wish it understood that I do not limit myself to the use of this expedient as other means might be employed to puncture the shell inclosing the molten glass and cause the latter to be discharged into the forming mold without the shell in its congealed condition passing into the mold to form an imperfection in the article of glassware being made.

I claim:

The method of making glassware which consists in introducing a gaging member into a gathering vessel having an open bottom, placing the open bottom of the gathering vessel in contact with a body of molten glass, creating an air current within said gathering vessel around said gaging member whereby molten glass is drawn upwardly through the open bottom of said vessel to the bottom of said gaging member, removing said gaging member from said vessel, and subjecting the molten glass in said vessel to pressure whereby the central portion of the molten glass is expelled through the open bottom of the vessel, and thereafter forming an article of glassware from the expelled molten glass.

In testimony that I claim the foregoing I hereunto affix my signature.

THOMAS C. MOORSHEAD.